(12) United States Patent
Xiao

(10) Patent No.: US 6,406,228 B1
(45) Date of Patent: Jun. 18, 2002

(54) WORKING TABLE OF MACHINE TOOL HAVING PROTECTIVE COVER

(76) Inventor: Alan Xiao, No. 436, Sec. 1, Chong San Road, Tarn Tzu Hsiang, Taichung Hsien (TW)

( * ) Notice: Subject to any disclaimer, the term of this patent is extended or adjusted under 35 U.S.C. 154(b) by 13 days.

(21) Appl. No.: 09/635,792

(22) Filed: Aug. 11, 2000

(51) Int. Cl.[7] .............................. B23C 9/00; B23Q 11/08
(52) U.S. Cl. ................ 409/134; 409/235; 29/DIG. 56; 29/DIG. 60; 451/451; 108/7
(58) Field of Search ................................ 409/134, 235; 29/DIG. 56, DIG. 60, DIG. 94; 74/613, 608; 483/3; 451/451; 83/860; 108/7, 6, 5

(56) References Cited

U.S. PATENT DOCUMENTS

| | | | | |
|---|---|---|---|---|
| 3,783,709 A | * | 1/1974 | Scott ............................ | 74/612 |
| 3,919,949 A | * | 11/1975 | Rendleman ................. | 451/451 |
| 4,350,193 A | * | 9/1982 | McCambridge et al. .... | 108/159 |
| 4,863,320 A | * | 9/1989 | Rutschle et al. ............. | 409/134 |
| 5,533,844 A | * | 7/1996 | Eckleberry .................... | 108/20 |
| 5,558,560 A | * | 9/1996 | Uchida ......................... | 451/24 |
| 5,954,623 A | * | 9/1999 | Davis .......................... | 483/35 |
| 6,257,811 B1 | * | 7/2001 | Schweizer et al. .......... | 409/134 |

FOREIGN PATENT DOCUMENTS

SU 0653087 * 3/1979 ................. 409/134

* cited by examiner

Primary Examiner—A. L. Wellington
Assistant Examiner—Erica E Cadugan
(74) Attorney, Agent, or Firm—Charles E. Baxley

(57) ABSTRACT

A machine tool includes a working table slidably supported on an upper portion of a base, and a protective cover rotatably secured to one or both of the ends of the working table with a pivot shaft. The protective cover is dependent downwardly when the protective cover is disengaged from the end portion of the base, and may be rotated to move upward. of the upper portion of the base when the working table is moved inward of the upper portion of the base. The cover may thus be used to suitably cover and shield the space formed between the working table and the base.

2 Claims, 4 Drawing Sheets

WORKING TABLE OF MACHINE TOOL HAVING PROTECTIVE COVER

BACKGROUND OF THE INVENTION

1. Field of the Invention

The present invention relates to a machine tool, and more particularly to a working table of a machine tool having an adjustable or movable protective cover.

2. Description of the Prior Art

As shown in FIG. 4, illustrated is a typical machine tool 10 including a working table 40 slidably supported on a base 20. The working table 40 includes two ends each having a protective cover 70 solidly secured thereto and slidable in concert with the working table 40. The space below the working table 40 or between the working table 40 and the support 20 still may not be suitably blocked and shielded when the support 20 is not suitably shielded by the protective covers 70. Some of the machine tools further provide a foldable cover 71 attached to the bottom of the support 20 for covering the other portions of the support 20. However, the foldable cover 71 includes a number of panels slidably engaged with each other and having a number of gaps formed between the panels, such that the chips or dirt may also entering into the base via the gaps formed between the panels.

The present invention has arisen to mitigate and/or obviate the afore-described disadvantages of the conventional machine tools.

SUMMARY OF THE INVENTION

The primary objective of the present invention is to provide a working table of a machine tool including an adjustable or movable protective cover for protecting the guiding track and for preventing the dirt from entering into the guiding track.

In accordance with one aspect of the invention, there is provided a machine tool comprising a base including an upper portion and including at least one end portion, a working table slidably supported on the upper portion of the base and including a first end, and a protective cover including a first end rotatably secured to the first end of the working table with a pivot shaft and rotatable about the pivot shaft. The protective cover is dependent downwardly when the protective cover is disengaged from the end portion of the base, and the protective cover is caused to rotate relative to the pivot shaft and to move upward of the upper portion of the base when the first end of the working table is moved inward of the upper portion of the base and when the protective cover is engaged with the end portion of the base.

A positioning device is further provided for positioning the cover to the working table and includes a rod pivotally coupled between the cover and the base for limiting a rotational movement of the cover relative to the base.

The rod includes two ends, the positioning device includes two couplers secured to the ends of the rod and pivotally secured to the cover and the base respectively for pivotally coupling the rod between the cover and the base.

The ends of the rod each includes an outer thread formed thereon, the couplers each includes an inner thread threaded with the outer thread of the rod for securing the couplers to the rod.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
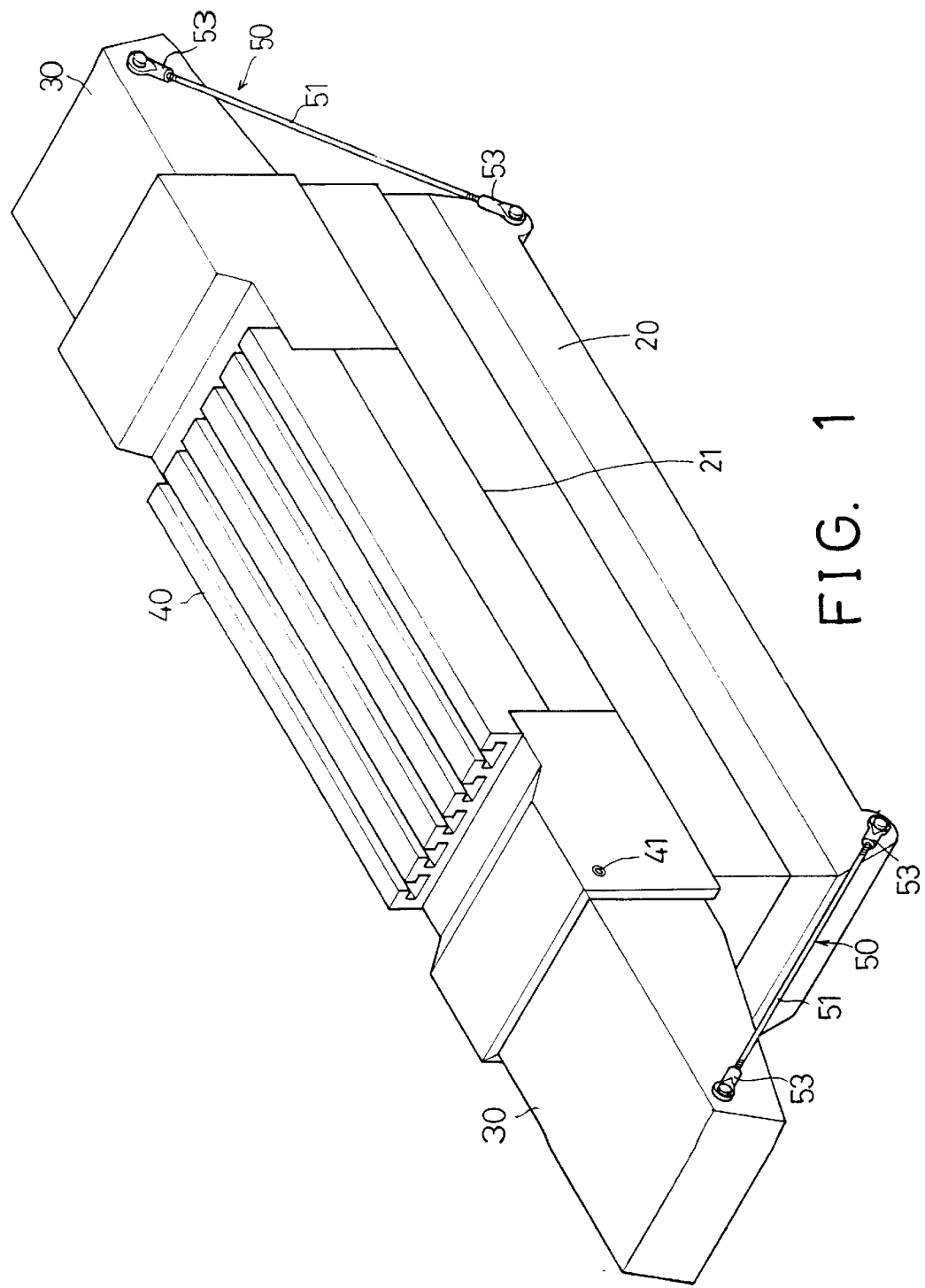
FIG. 1 is. a perspective view of a working table and a support of a machine tool in accordance with the present invention.
Figure 2:
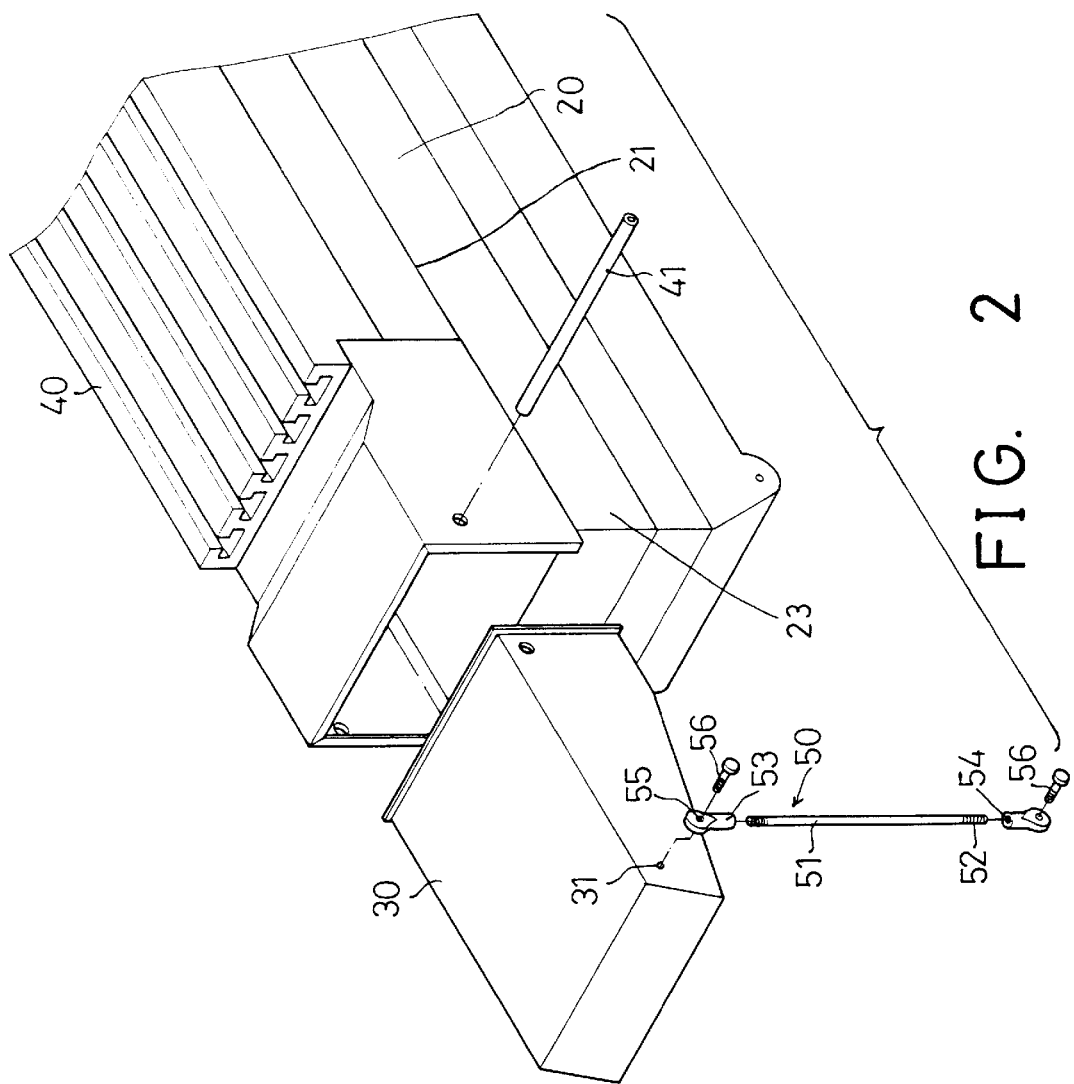
FIG. 2 is a partial exploded view of working table and the protective cover.

Referring to the drawings, and initially to FIGS. 1 and 2, a machine tool in accordance with the present invention comprises a working table 40 slidably supported on a base 20 which may include a guiding track 21 provided on top thereof for slidably supporting and guiding the working table 40 to move laterally or forwardly or rearwardly etc. The working table 40 includes two ends that may be moved inward or outward beyond the supporting base 20 such that the upper portion of the base 20 may be exposed and such that the dirt or the cut chips may enter into the guiding track 21 of the base 20. The present invention is to provide a protective covering device for covering or shielding the guiding track 21 and/or the upper portion of the base 20.

The working table 40 includes one or two ends each having a protective cover 30 pivotally or rotatably secured thereto with a pivot shaft 41. The protective cover 30 has one end pivotally or rotatably secured to the working table 40 such that the protective cover 30 is rotatable relative to the working table 40 about the pivot shaft 41. A positioning device 50 is coupled between the other end or the free end of the protective cover 30 and the base 20 for positioning the cover 30 and for limiting the movement of the cover 30 relative to the base 20 and the working table 40. The positioning device 50 includes a rod 51 having an outer thread 52 formed on one or both of the ends thereof. Two couplers 53 each has an inner thread 54 secured to the ends of the rod 51 with the outer thread 52, and each includes an orifice 55 formed therein for receiving a pivot pin or a fastener 56. One of the fasteners 56 is threaded with a screw hole 31 that is formed in the other end of the cover 30 for pivotally or rotatably coupling one end of the rod 51 to the other end of the cover 30. The other fastener 56 is threaded with the base 20 for pivotally or rotatably coupling the other end of the rod 51 to the base 20. The couplers 53 may also be secured to the couplers 53 with the other securing device or method, such as the welding process, or may be directly and pivotally or rotatably secured to the cover 30 and the base 20.

Figure 3:
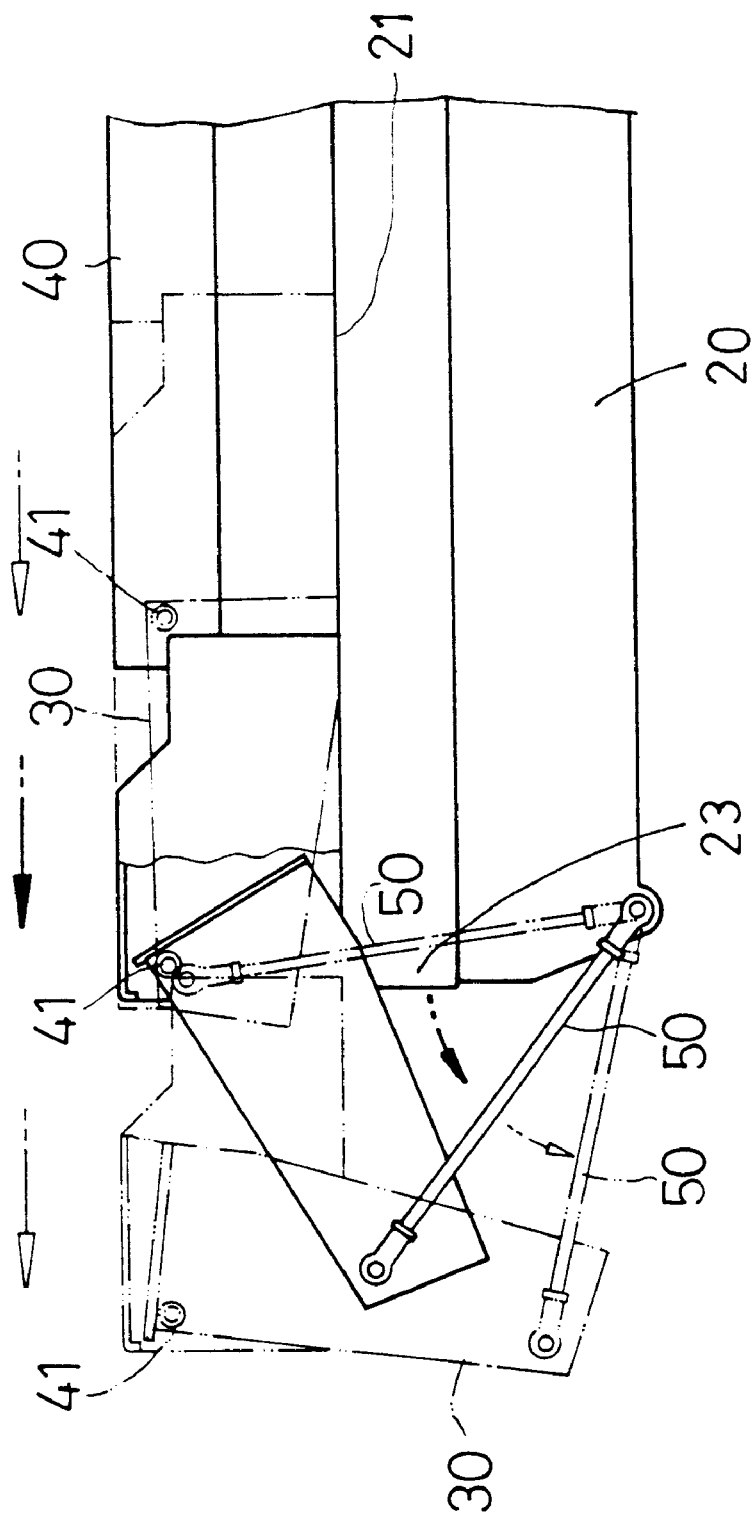
FIG. 3 is a partial plane view illustrating the operation of the protective cover of the machine tool.
Figure 4:
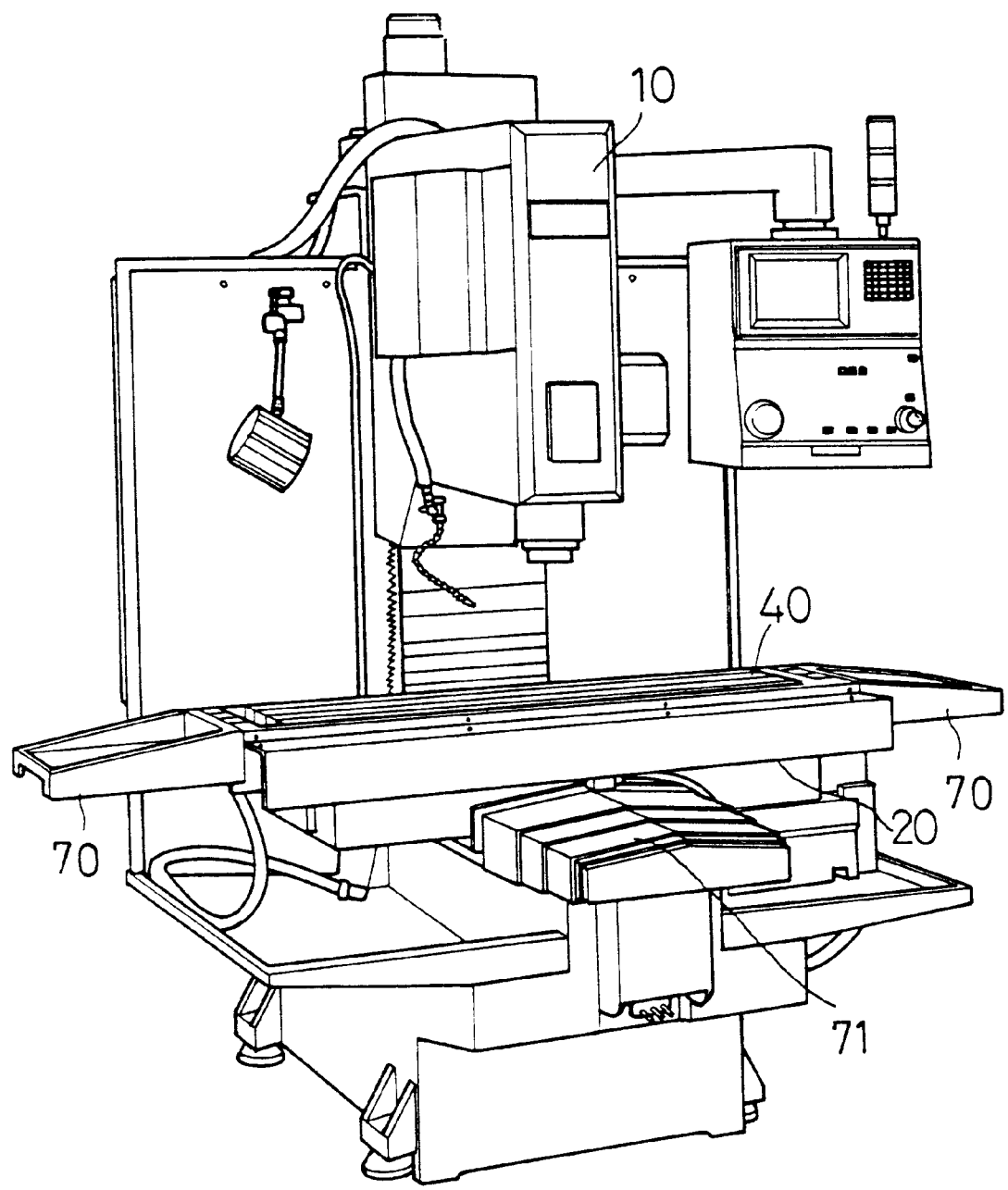
FIG. 4 is a perspective view of a typical machine tool.

In operation, as shown in FIG. 3, when the working table 40 is slided or moved along the guiding track 21 of the base 20, the working table 40 may be moved inward or outward beyond the end portion 23 of the base 20. When the working table 40 is moved inward of the end portion 23 of the base 20, the cover 30 may be forced to rotate upward about the pivot shaft 41 to the horizontal position or to be horizontally supported above the guiding track 21 or horizontally supported on the upper portion of the base 20. When the working table 40 is moved outward beyond the end portion 23 of the base 20, the cover 30 may be dependent downwardly by its own weight. The rod 51 of the positioning device 50 may limit or may guide the movement of the cover 30 relative to the base 20 and the working table 40, and may prevent the cover 30 from fluctuating or oscillating. When the cover 30 is dependent downwardly, the space between the working table 40 and the base 20 may also be suitably covered or shielded.

Accordingly, the machine tool in accordance with. the present invention includes an adjustable or movable protective cover for protecting the guiding track and for preventing the dirt from entering into the guiding track.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine tool comprising:

a base including an upper portion and including at least one end portion;

a working table slidably supported on said upper portion of said base, having an upper surface, said working table being slidable to a position outward of the base beyond the at least one end portion of the base, and including a first end;

a protective cover including a first end rotatably secured to said first end of said working table with a pivot shaft and rotatable about said pivot shaft, and including a second end opposite said first end of said cover;

said second end of said protective cover being rotatable about said pivot shaft to a position located below said upper surface of said working table when said working table is moved to said outward position, and said protective cover being caused to rotate relative to said pivot shaft and to move upward of said upper portion of said base when said first end of said working table is moved to a position that is not outward of the base beyond the at least one end portion of the base; and a positioning means for positioning said cover relative to said working table, said positioning means including a rod pivotally coupled between said cover and said base for limiting a rotational movement of said cover relative to said base, said rod including two ends, said positioning means further including two couplers secured to said ends of said rod and pivotally secured to said cover and said base respectively for pivotally coupling said rod between said cover and said base.

2. The machine tool according to claim 1, wherein said rod includes two ends each having an outer thread formed thereon, said couplers each includes an inner thread threaded with said outer thread of said rod for securing said couplers to said rod.

* * * * *